United States Patent
Maranov

(10) Patent No.: US 7,546,948 B2
(45) Date of Patent: Jun. 16, 2009

(54) IDENTIFICATION DEVICE AND METHOD

(75) Inventor: John P. Maranov, New York, NY (US)

(73) Assignee: MeadWestvaco Corporation, Glen Allen, VA (US)

( * ) Notice: Subject to any disclaimer, the term of this patent is extended or adjusted under 35 U.S.C. 154(b) by 0 days.

(21) Appl. No.: 11/226,781

(22) Filed: Sep. 14, 2005

(65) Prior Publication Data

US 2007/0057054 A1    Mar. 15, 2007

(51) Int. Cl.
    *G06K 7/10*    (2006.01)
    *G06K 19/00*    (2006.01)
    *G06K 19/06*    (2006.01)
    *H01Q 1/42*    (2006.01)
    *H01Q 1/12*    (2006.01)
    *G06K 9/18*    (2006.01)

(52) U.S. Cl. .......... 235/462.01; 235/492; 235/462.09; 235/487; 343/718; 343/872

(58) Field of Classification Search ........... 235/492, 235/487, 383, 462.01; 340/572.1, 10.31, 340/10.5
See application file for complete search history.

(56) References Cited

U.S. PATENT DOCUMENTS

| | | | | |
|---|---|---|---|---|
| 5,059,951 A * | 10/1991 | Kaltner | .................... | 235/383 |
| 5,659,167 A * | 8/1997 | Wang et al. | ............ | 235/462.08 |
| 5,786,910 A * | 7/1998 | Walters et al. | ............... | 235/492 |
| 5,962,834 A * | 10/1999 | Markman | .................... | 235/492 |
| 6,168,080 B1 * | 1/2001 | Verschuur et al. | ...... | 235/462.01 |
| 6,202,929 B1 * | 3/2001 | Verschuur et al. | ...... | 235/462.25 |
| 6,356,764 B1 | 3/2002 | Ovard et al. | | |
| 6,427,922 B1 * | 8/2002 | Marchand | .................... | 235/494 |
| 6,547,140 B2 * | 4/2003 | Marchand | .............. | 235/462.01 |
| 6,727,803 B2 * | 4/2004 | Hulvey | .................... | 340/10.31 |
| 6,830,181 B1 | 12/2004 | Bennett | | |
| 6,836,215 B1 * | 12/2004 | Laurash et al. | ........... | 340/572.1 |

(Continued)

FOREIGN PATENT DOCUMENTS

DE      4207798 A1 *    9/1993

(Continued)

OTHER PUBLICATIONS

James C. Rautio, "A Design Example of a 900MHz RFID Antenna", Sonnet Software, Inc. Oct. 2004.

(Continued)

*Primary Examiner*—Steven S Paik
*Assistant Examiner*—Thien T Mai

(57) ABSTRACT

The invention provides an identification device and method. The device includes a pattern adapted and configured to be read optically by a reader to obtain information. The pattern is formed at least in part by electrically conductive material. The device also includes a resonant circuit configured to resonate at a resonant frequency, the resonant circuit formed at least in part from the electrically conductive material of the pattern. The device may include a plurality of conductive members and may be adapted and configured to be read optically by a bar code reader. The plurality of parallel conductive members may be formed in a serpentine pattern or a continuous winding pattern, among others. The resonant circuit may also be configured to act as a dipole. Each of the conductive members may be connected by a straight conductor at an end of each of the conductive members.

50 Claims, 8 Drawing Sheets

U.S. PATENT DOCUMENTS

| | | | |
|---|---|---|---|
| 6,871,780 B2* | 3/2005 | Nygren et al. | 235/375 |
| 6,891,110 B1* | 5/2005 | Pennaz et al. | 174/260 |
| 6,994,262 B1* | 2/2006 | Warther | 235/492 |
| 7,079,832 B2* | 7/2006 | Zalewski et al. | 455/405 |
| 7,136,709 B2* | 11/2006 | Arling et al. | 700/65 |
| 7,155,305 B2* | 12/2006 | Hayes et al. | 700/224 |
| 7,173,530 B2* | 2/2007 | Lambright et al. | 235/385 |
| 7,284,704 B2* | 10/2007 | Lubow | 235/462.01 |
| 2002/0036237 A1* | 3/2002 | Atherton et al. | 235/492 |
| 2002/0167500 A1* | 11/2002 | Gelbman | 345/204 |
| 2004/0075534 A1* | 4/2004 | Pierce et al. | 340/10.5 |
| 2005/0284941 A1* | 12/2005 | Lubow | 235/462.01 |
| 2006/0232413 A1* | 10/2006 | Lam et al. | 340/572.1 |
| 2007/0018532 A1* | 1/2007 | Horning et al. | 310/309 |
| 2007/0057311 A1* | 3/2007 | Leenders et al. | 257/315 |

FOREIGN PATENT DOCUMENTS

EP    1811432 A1 *    7/2007

OTHER PUBLICATIONS

Bob Scher, Dynasys, www.rfidusa.com, RFiD, RFID Shelf Antennas, Dynasys Technologies, Inc., 2004, pp. 1-3.

2D Barcodes Explained, www.barcodeman.com/faq/2d.php, Aug. 25, 2005, pp. 1-5.

Jonathan Collins, "Proposed Standard for Ink Antennas", RFID Journal, www.rfidjournal.com/article/view/614, Aug. 25, 2005, pp. 1-3.

Jay K. Sperry, "Radio Frequency Identification Technology: An Investigation of Process Benchmarks", Department of Graphic Communications, Clemson University, FFTA/Sun Chemical Fellowship Recipient, 2004-2005.

http://graphics.clemson.edu/itc/research.htm—Research Library, Student and Faculty Print Research Center, Department of Graphics Communications, College of Business & Behavioral Science, Clemson University, Jul. 18, 2005, pp. 1-6.

Greg S. Pope et al., "Innovative Systems Design for 13.56MHz RFID", Integrated Silicon Design Pty. Ltd., Adelaide, SA—Australia.

* cited by examiner

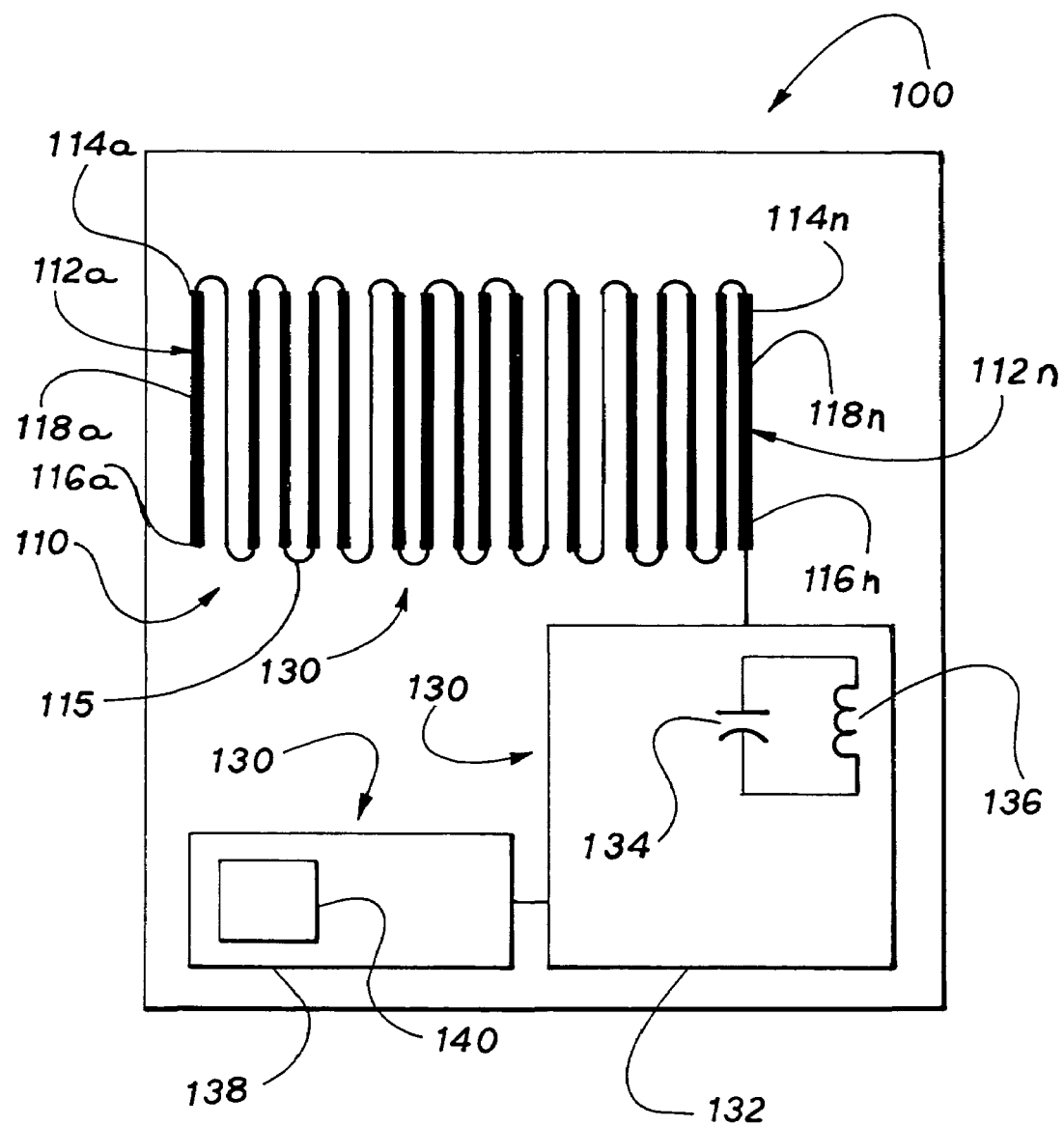
Fig_1

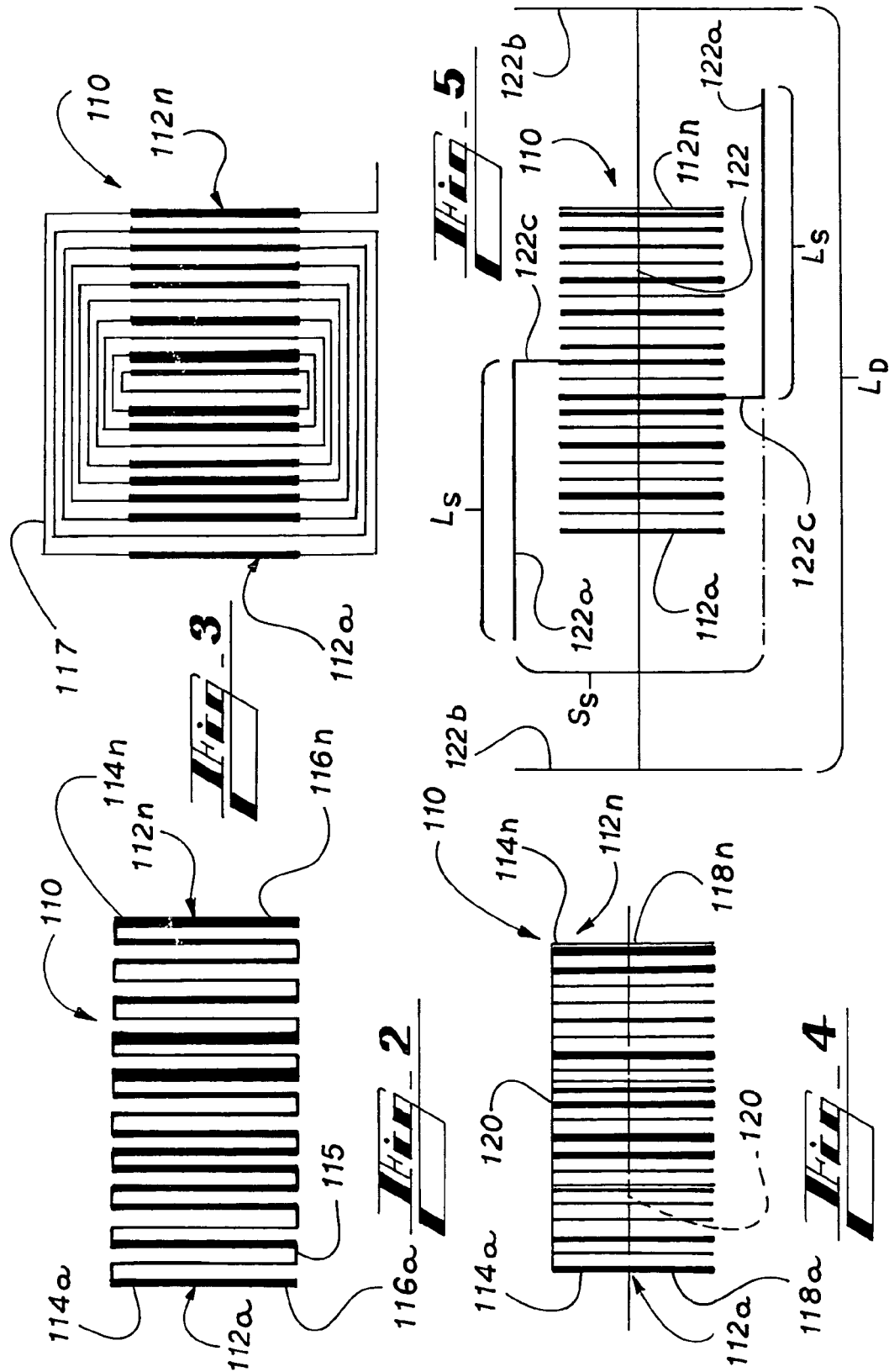

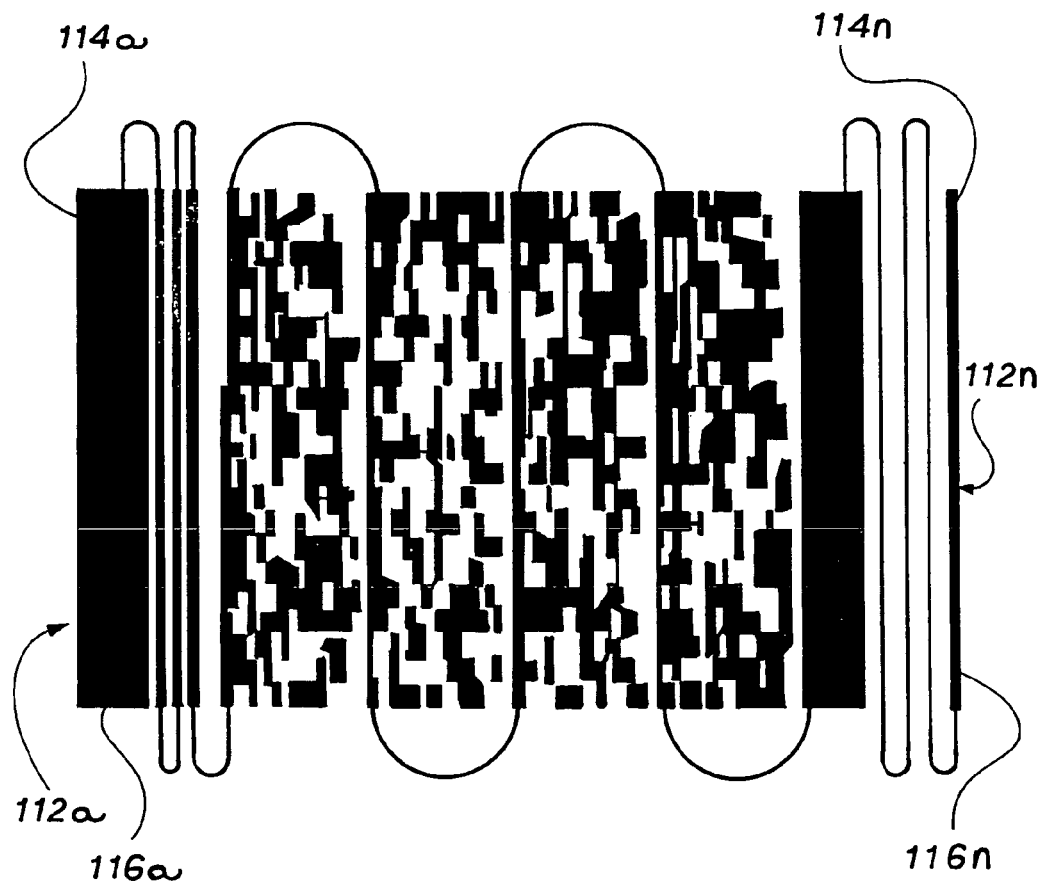
Fig_6

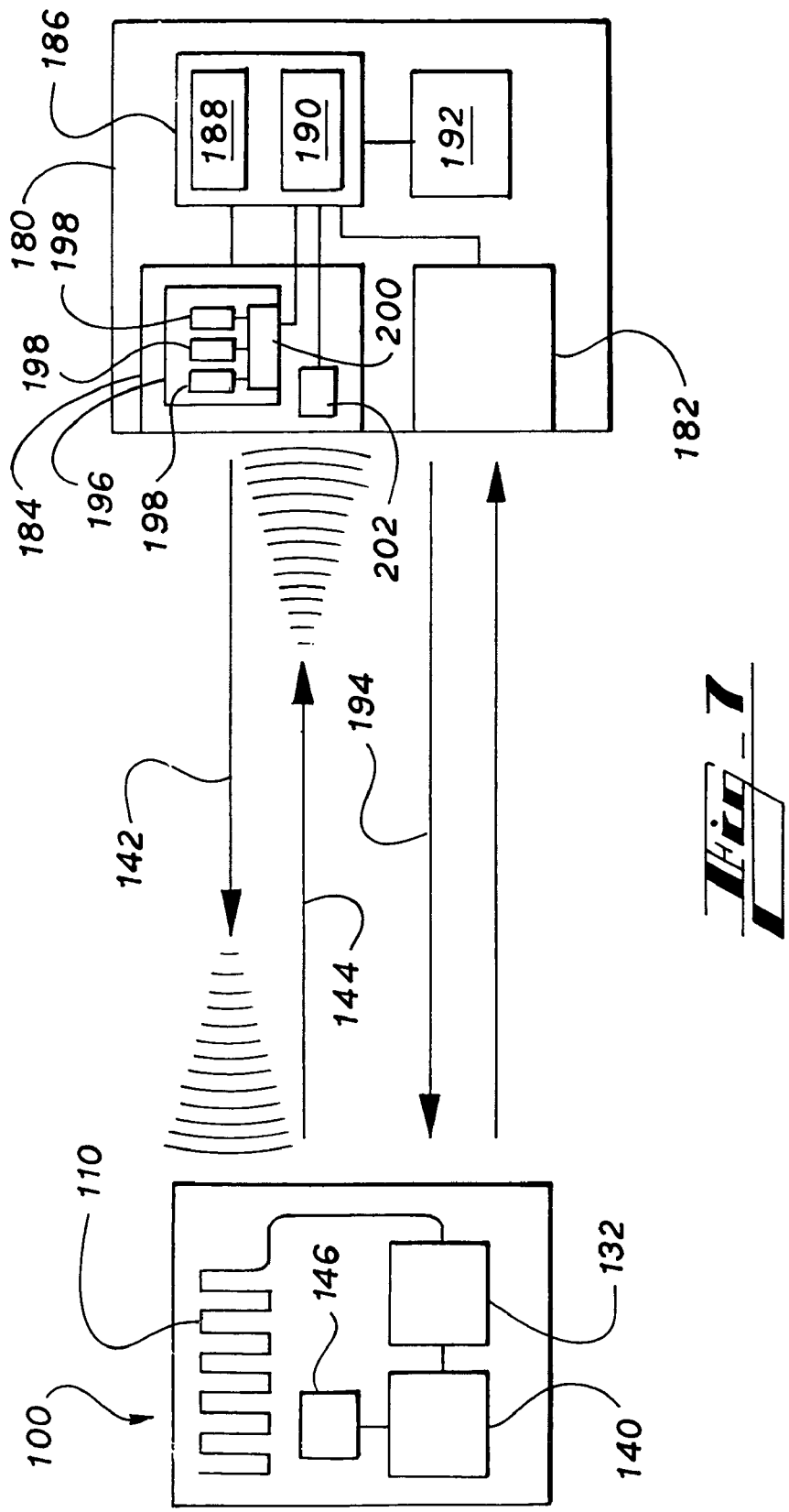

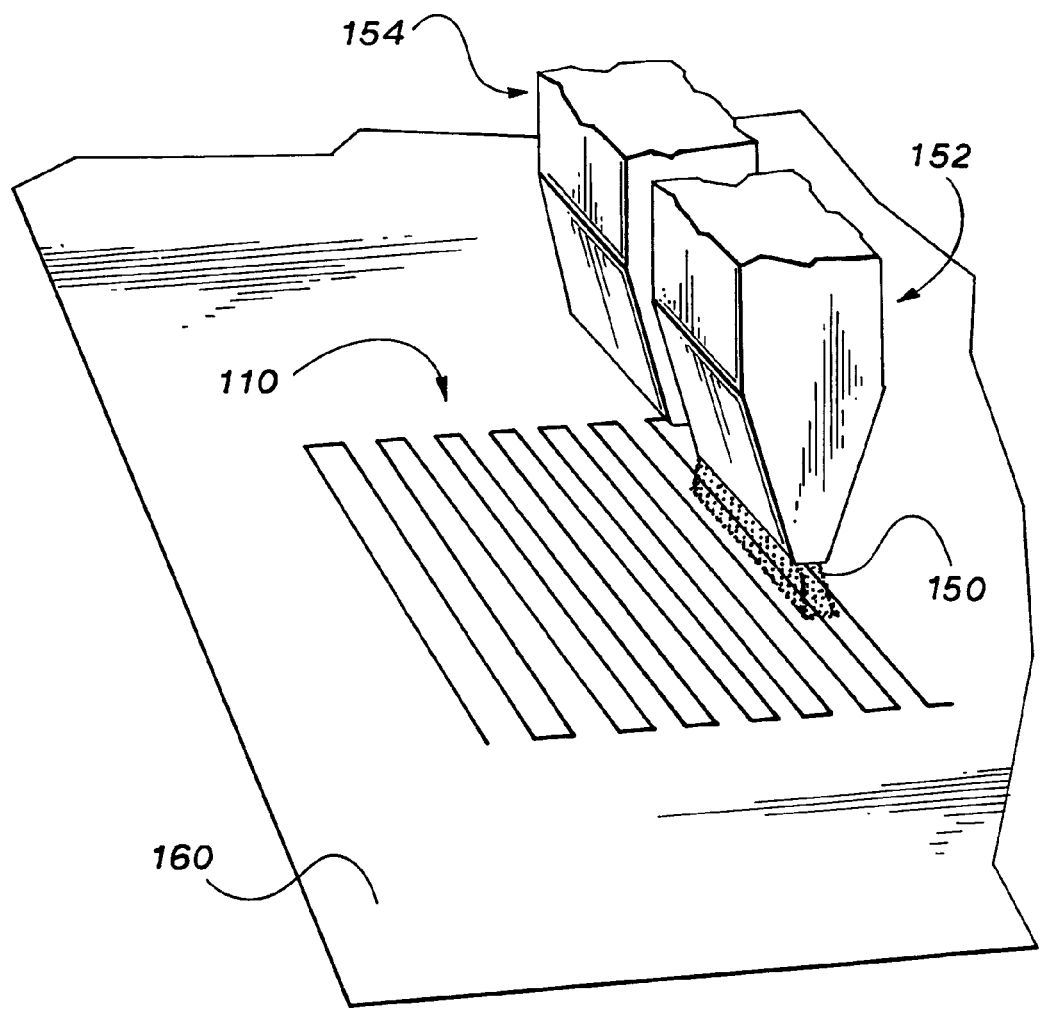
Fig_8

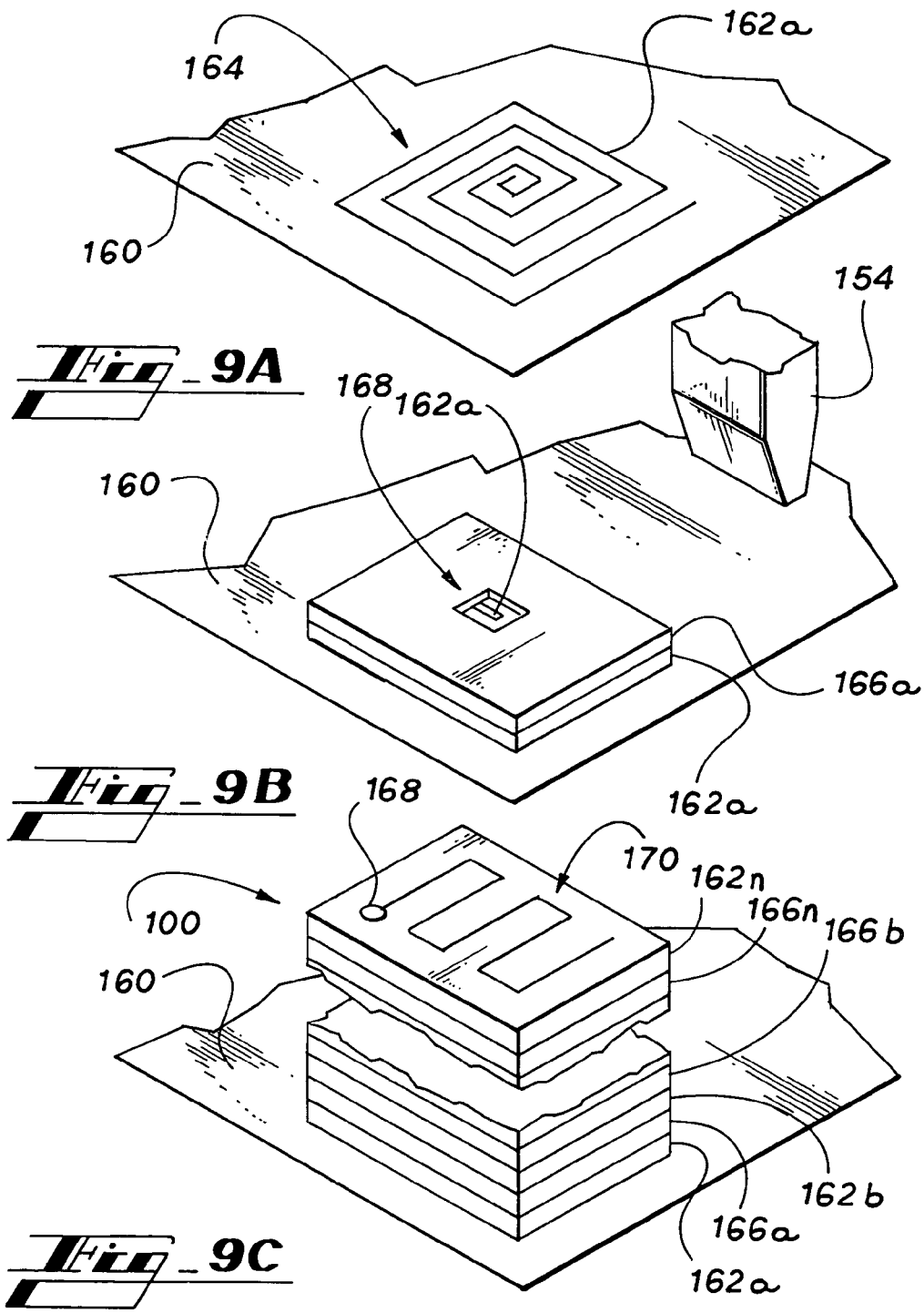

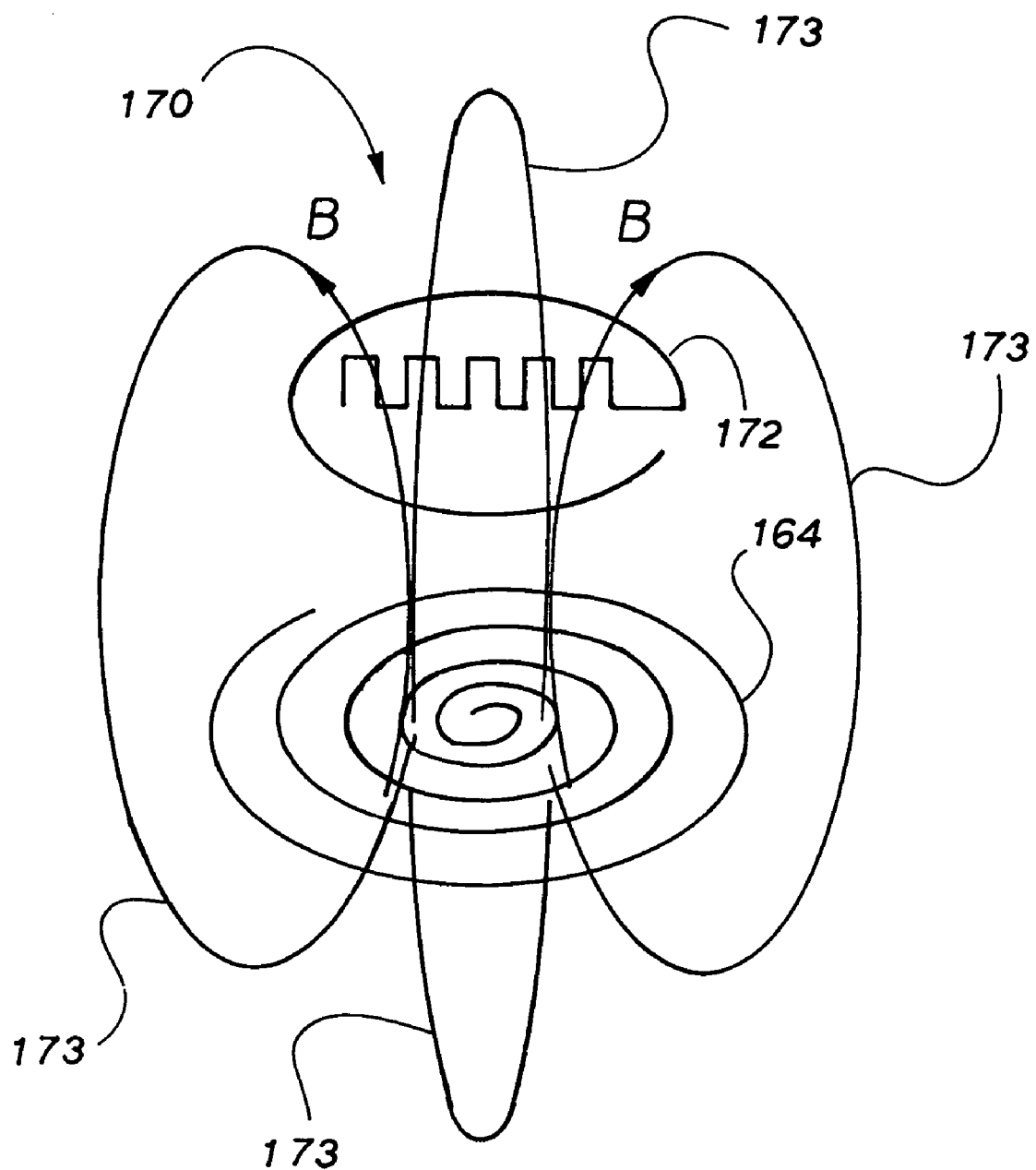
Fig_10

IDENTIFICATION DEVICE AND METHOD

BACKGROUND OF THE INVENTION

1. Field of the Invention

The present invention relates to an identification device and method. Particularly, the present invention is directed to an improved radio frequency identification tag that may be read by both optical and electromagnetic means for identifying objects.

2. Description of Related Art

A variety of identification devices are known in the art for identifying objects by using optical means or electromagnetic means. For example, bar codes have existed for many decades wherein an optically readable bar code is provided that may contain information in machine readable format. When such a bar code is optically scanned by a scanner, this information may be read.

Likewise, radio frequency identification ("RFID") systems have also existed for quite some time and are widely used. In such devices, a resonant circuit is provided that may detect and transmit electromagnetic radiation containing identification information.

Electronic identification such as RFID systems typically comprise two devices which are configured to communicate with one another. Preferred configurations of the electronic identification systems are operable to provide such communications via a wireless medium. For example, such a system may include an interrogator and a remote transponder, such as a tag or card. Such systems are described, for example, in U.S. Pat. No. 6,356,764, which is incorporated by reference herein in its entirety.

Such communication systems may be used in various applications such as identification applications. The interrogator is configured to output a polling or interrogation signal which may comprise a radio frequency signal including a predefined interrogation code using which the interrogator may address remote transponders. The remote transponders of such a communication system are operable to transmit an identification signal responsive to receiving an appropriate polling or interrogation signal.

More specifically, the appropriate transponders are configured to recognize the predefined code. The transponders receiving the code may subsequently output a particular identification signal which is associated with the transmitting transponder. Following transmission of the polling signal, the interrogator is configured to receive the identification signals enabling detection of the presence of corresponding transponders.

Such communication systems are useable in identification applications such as inventory or other object monitoring. For example, a remote identification device may be attached to an object of interest. Responsive to receiving the appropriate polling signal, the identification device is equipped to output an identification signal. Generating the identification signal indicates the presence or location of the identification device and the article or object attached thereto.

Such conventional methods and systems generally have been considered satisfactory for their intended purpose. However, many applications are well suited for use with a combination of the bar code and RFID systems. For example, RFID tags on groups of objects, such as saleable goods, that are stored on pallets as the pallets are brought into and move through a warehouse or stocking department may be used to efficiently track inventory, while bar codes on each individual item may be used in the purchase of each object by a consumer.

Accordingly, there is a strong need for methods and systems that can efficiently utilize the bar code and RFID systems in conjunction with one another. Although solutions to this problem have been developed, such as by placing individual separately manufactured bar codes and RFID tags on such objects, this results in more expense and complication than using only one such identification system. Moreover, while a bar code can usually be printed, manufacture of RFID tags generally involves a separate manufacturing operation, and subsequent steps of applying the RFID tag to a substrate, and then eventually to the object that is to be tracked. Thus, there still remains a continued need in the art for a system that can efficiently utilize the bar code and RFID systems in conjunction with one another. The present invention provides a solution for these problems.

SUMMARY OF THE INVENTION

The purpose and advantages of the present invention will be set forth in the description that follows, as well as will be learned by practice of the invention. Additional advantages of the invention will be realized and attained by the methods and systems particularly pointed out in the written description and claims hereof, as well as from the appended drawings.

To achieve these and other advantages and in accordance with the purpose of the invention, as embodied herein and broadly described, the invention includes a device for containing information. The device includes a pattern adapted and configured to be read optically by a reader to obtain information. The pattern is formed at least in part by electrically conductive material. The device further includes a resonant circuit configured to resonate at a resonant frequency, wherein the resonant circuit is formed at least in part from at least some of the electrically conductive material of the pattern.

In accordance with a further aspect, the device may include a plurality of conductive members and is adapted and configured to be read optically by a bar code reader. The plurality of parallel conductive members may be formed in a serpentine pattern or a continuous winding pattern, among others. The resonant circuit may also be configured to act as a dipole. Each of the conductive members may be connected by a straight conductor at an end of each of the conductive members. If desired, the plurality of conductive members may be arranged into a two-dimensional bar code pattern.

In accordance with another aspect, an identification tag including a device made in accordance with the invention is provided. The tag may be configured to receive a first electromagnetic wave at the resonant frequency, and transmit a second electromagnetic wave in response to the first electromagnetic wave. The identification tag may also be configured to transmit unique identification information in the second electromagnetic wave. Additionally or alternatively, the second electromagnetic wave may include a backscattered signal by disturbing the first electromagnetic wave as distinguished from actively transmitting a separate signal.

In accordance with a further aspect of the invention, the conductive portion of the pattern may be formed from metal, such as a metallic wire or sheet. The device may additionally or alternatively include a substrate, wherein the pattern is formed by printing a conductive material onto the substrate, such as by using a laser printer or inkjet printer. Moreover, if desired, additional portions of the resonant circuit may be formed on the substrate by printing techniques.

In accordance with still another aspect of the invention, the pattern may include a first layer disposed the substrate, the first layer including an initial pattern, the initial pattern including conductive material. As such, the first layer can be disposed on the substrate directly such that it is in contact with the material, or on a layer of a different material over the substrate. A second layer may be disposed on the first layer, the second layer including dielectric material. A third layer may be further disposed on the second layer, the third layer including a terminal pattern configured and adapted to be read optically by a reader to obtain information, wherein the terminal pattern includes conductive material, and wherein the initial pattern and the terminal pattern are in operative communication with each other.

In accordance with another embodiment, an article of manufacture is provided including an object to be sold and a device as described herein disposed on the object. The object to be sold may be a product contained inside protective packaging.

In accordance with another aspect, the invention also provides a method such as for forming an exemplary embodiment of a device as described herein. The method includes the steps of providing a substrate, forming a pattern capable of being read optically by a reader to obtain information on the substrate, the pattern formed at least in part by conductive material, and forming other portions of a resonant circuit configured to resonate at a resonant frequency, the resonant circuit formed at least in part from the electrically conductive material of the pattern.

In further accordance with the method of the invention, the pattern forming step may include forming a plurality of parallel conductive members, the plurality of conductive members configured and adapted to be read by a bar code reader. The plurality of parallel conductive members can be formed into a variety of patterns. The conductive portion of the pattern can be formed, for example, from a metallic portion, or by printing a conductive material onto the substrate using a variety of printing techniques. Additional portions of the resonant circuit may also be formed by printing conductive material on the substrate. The pattern forming step can include forming alternating layers of conductive and dielectric material on top of one another. The device may be formed on a printer having a first printing head configured and adapted to deposit conductive material, and a second printing head configured and adapted to deposit dielectric material. Moreover, a high speed offset printing press can also be used to make a device in accordance with the invention. In accordance with this embodiment, a plurality of printing stations may be provided adapted and configured to deposit conductive or dielectric material on the substrate. In accordance with one embodiment, a digital printing press can be used.

In accordance with still another aspect of the invention, a machine readable program containing instructions for controlling a system for forming a pattern of conductive material on a substrate is provided. The system includes a substrate and a printer capable of printing material on the substrate. The program includes means for instructing the printer to print a pattern on the substrate, the pattern adapted and configured to be read optically by a reader to obtain information, wherein the pattern includes conductive material.

In accordance with a further aspect of the invention, the machine readable program may further include means for instructing the printer to print a plurality of parallel conductive members in the portion of the pattern that is read optically. The plurality of parallel conductive members may be printed in a variety of patterns. Means can be further provided for instructing the printer to print further portions of a resonant circuit on the substrate. Means can also be provided for constructing a pattern having multiple interleaved layers of conductive and dielectric material as described herein. Moreover, it is possible to have consecutive layers of dielectric or conductive material, where desired.

In accordance with still another aspect of the invention, a system for identifying an object is provided, including a device as described herein in combination with a reader adapted and configured to read information from the device. The reader may be configured to optically scan the pattern to obtain the information. For example, the reader may be configured to transmit a first electromagnetic wave to the device at the resonant frequency, and receive a second electromagnetic wave from the resonant circuit in response to the first electromagnetic wave.

In accordance with still a further aspect, the resonant frequency can be between about 125 kHz and 150 kHz, 13 MHz and 14 MHz, 850 MHz and 1000 MHz, and 2 GHz and 3 GHz. In accordance with one embodiment, the resonant frequency is about 866 MHz.

It is to be understood that both the foregoing general description and the following detailed description are exemplary and are intended to provide further explanation of the invention claimed.

The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF THE DRAWINGS

FIG. 1 is a schematic view of a first representative embodiment of a device made in accordance with the present invention;

FIG. 2 is a schematic view of a portion of the identification tag of FIG. 1;

FIG. 3 is a schematic view of a portion of a second representative embodiment of a device made in accordance with the present invention;

FIG. 4 is a schematic view of a portion of a third representative embodiment of a device made in accordance with the present invention;

FIG. 5 is a schematic view of a portion of a fourth representative embodiment of a device made in accordance with the present invention;

FIG. 6 is a schematic view of a portion of a fifth representative embodiment of a device made in accordance with the present invention;

FIG. 7 is a schematic view of a system made in accordance with the present invention;

FIG. 8 is a partial perspective view of a system and method for manufacturing a device made in accordance with the present invention;

FIGS. 9(a)-9(c) are partial perspective views of an alternate embodiment of a system and method for manufacturing a device made in accordance with the present invention;

FIG. 10 is a schematic view of a portion of another alternate embodiment of a device made in accordance with the present invention.

DETAILED DESCRIPTION OF THE PREFERRED EMBODIMENT

Figure 11:
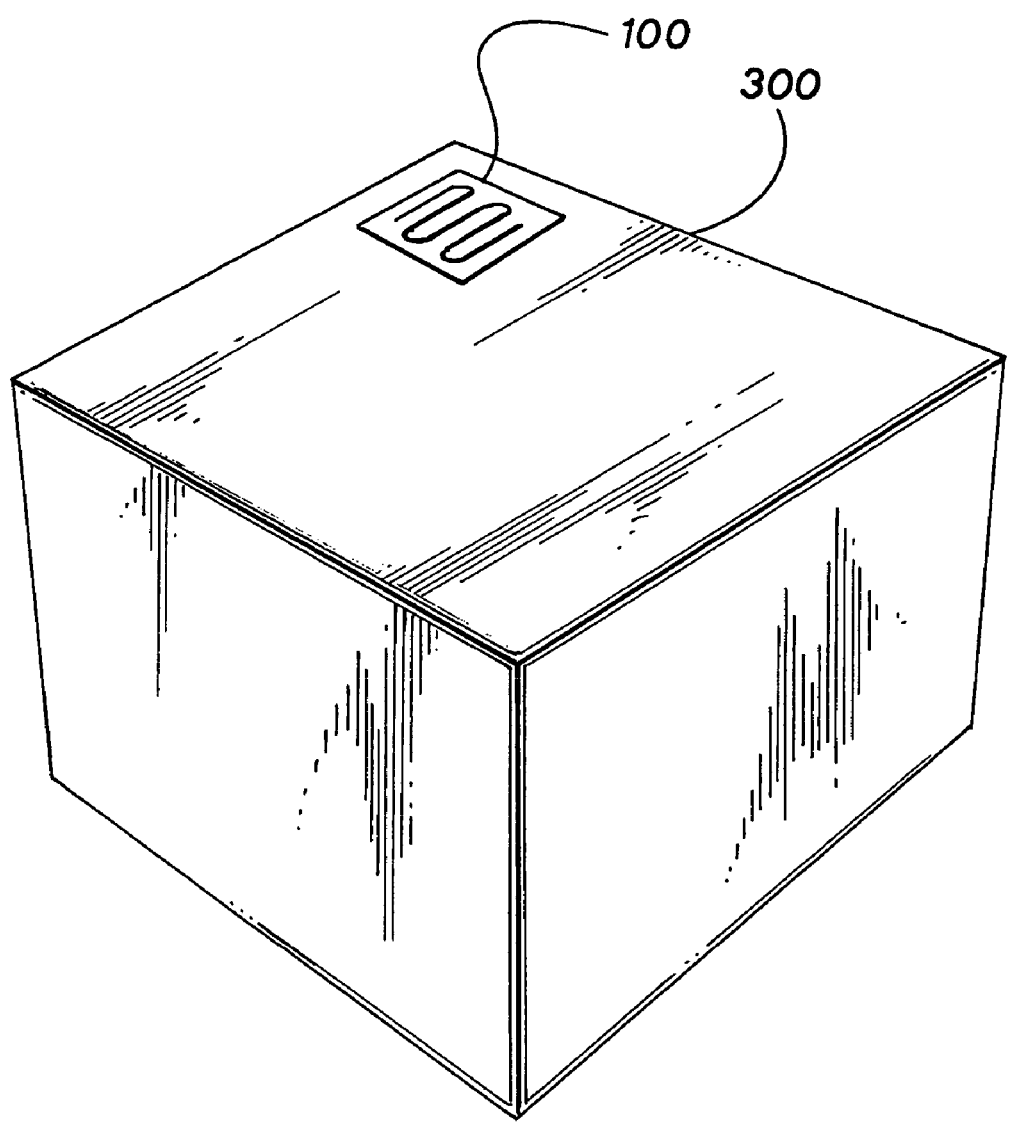
FIG. 11 is a perspective view of an article of manufacture made in accordance with the present invention.

Reference will now be made in detail to the present preferred embodiments of the invention, an example of which is illustrated in the accompanying drawings. The method and corresponding steps of the invention will be described in conjunction with the detailed description of the system.

The devices and methods presented herein may be used for identifying physical objects, among other things. The present invention is particularly suited for identifying goods for purposes of storage and commerce, such as in the shipment of commercial products and/or maintaining inventory.

In accordance with the invention, an identification device is provided. The device includes a pattern adapted and configured to be read optically by a reader to obtain information, wherein the pattern is formed at least in part from conductive material. The device also includes a resonant circuit configured to resonate at a resonant frequency, wherein the resonant circuit is formed at least in part from at least a portion of the electrically conductive material of the pattern.

For purpose of explanation and illustration, and not limitation, a partial view of an exemplary embodiment of a device in accordance with the invention is shown in FIG. 1 and is designated generally by reference character 100. Other embodiments of a device in accordance with the invention, aspects thereof or systems incorporating such a device, are provided in FIGS. 2-11, as will be described.

In accordance with the invention, a device including a pattern adapted and configured to be read optically by a reader to obtain information is provided, wherein the pattern is formed at least in part by conductive material.

For purposes of illustration and not limitation, as embodied herein and as depicted in FIG. 1, device 100 is provided with a pattern 110. As depicted, pattern 110 is defined by a plurality of parallel conductive members 112a-112n that may be optically read by a reader, such as a conventional bar code reader, among others. Conductive members 112a-112n each have a first end 114a- 114n, a second end 116a-116n and a central region 118a-118n.

The plurality of parallel conductive members 112a-112n may be formed in a variety of shapes. For example, it is possible to form members 112a-112n into a serpentine pattern as depicted in FIGS. 1 and 2 by connecting adjacent ends 114a-114n, 116a-116n using bridge portions 115, or a continuous winding pattern as depicted in FIG. 3 by using bridge portions 117, among others. By way of further example, conductive members 112a-112n may be connected by a straight or curved conductor in a variety of locations. As depicted in FIG. 4, conductive members 112a-112n may be connected by a straight conductor 120 at an end 114a-114n of each of the conductive members 112a- 112n. Straight conductor 120 may be placed along the ends of conductive members as depicted in FIG. 4, or proximate a medial region 118a-118n of each conductive member 112.

Pattern 110 preferably resembles a bar code, as is well known in the art. Generally speaking a bar code includes a series of vertical bars of varying widths, in which each of the digits zero through nine are represented by a different pattern of bars that may be read by a laser scanner. The bars are commonly found on consumer products and are used especially for inventory control. While forming pattern 110 into the shape of a one-dimensional pattern bar code has been discussed above, a two-dimensional bar code (containing information in two directions instead of only one) may also be employed, as depicted in FIG. 6. As depicted, pattern 110 in FIG. 6 still includes generally parallel conductive members 112a-112n that may be conducted as desired to form a conductor of a desired length.

In further accordance with the invention, the device also includes a resonant circuit configured to resonate at a resonant frequency. The resonant circuit includes at least a portion of the conductive portion of the pattern.

For purposes of illustration and not limitation, as embodied herein and as depicted in FIG. 1, device 100 is provided with a resonant circuit 130 that may function as a transmitter/receiver in combination with a conductive portion of pattern 110. Resonant circuit preferably includes a first portion 132 that has a capacitor 134 and an inductor 136. The capacitor 134 and inductor 136 may be selected to create a desired resonant frequency of the circuit 130. For example, there are a number of resonant frequencies that have been used to date in RFID technology. For example, the resonant frequency may be between about 125 kHz and 150 kHz, 13 MHz and 14 MHz., 850 MHz and 1000 MHz, or even between about 2 GHz and 3 GHz. Specific frequencies popularly employed include low resonant frequencies between about 125-148 kHz, high frequencies of about 13.56 MHz, ultra-high frequencies of about 915 MHz and microwave frequencies of about 2.45 GHz. The ability to use certain frequencies is generally regulated by governmental entities. As such, the availability of frequencies in certain bands can vary from country to country. For example, a preferred resonant frequency for Europe is 866 MHz.

As is known in the art, the impedance of the resonant circuit 130 will be influenced by the configuration of the conductive portion of pattern 110 that is in electrical communication with, and forms a part of, resonant circuit 130. Although FIG. 1 depicts pattern 110 being connected to the rest of resonant circuit in only one location, this is meant to merely be representative. Pattern 110 can be connected to other portions of resonant circuit 130 in a number of locations.

Depending on the configuration of the conductive material in pattern 110, the resonant circuit 130 will need to be tuned to a resonance at the center frequency desired for operation (e.g., 13.56 MHz.). Tuning of resonant circuit is accomplished by matching a combination of inductance and capacitance, as is known in the art. Moreover that resonant circuit must be tuned to have an optimal bandwidth ("Q") to ensure that sidebands, caused by the data signals being modulated onto the center frequency carrier wave, may fit into the bandpass of the resonant circuit 130. If the resonant circuit 130 is tuned too narrowly the sidebands will be cut off and lost. If the resonant circuit is tuned too widely, random ambient noise occurring in that frequency range will pass through, which in turn can degrade the quality of the signal being received. Likewise, selection of a particular resonant frequency will impose certain design considerations regarding the geometry of the pattern 110 in the resonant circuit. As such, circuit shape, material and conductor geometry all must be considered when designing a device, such as an identification tag, in accordance with the present invention. It should also be noted that the Figures of this application are meant to be schematic representations to illustrate devices made in accordance with the invention, and are not to scale.

For example, if a resonant frequency of 13.56 MHz is selected as a desired resonant frequency, certain shapes of pattern 110 will be preferable over others. RFID tags in this frequency range operate through inductive coupling. Accordingly, a pattern 110 having a spiral shape such as that depicted in FIG. 3 may be particularly suitable to enhance inductive coupling.

However, other configurations such as a dipole configuration may also be used for resonant circuit 130. For example, FIG. 5 depicts a pattern 110 that may include a dipole 122. In accordance with this embodiment, members 112a-112n may be provided in a non conductive form, but conductor 122 including portions 122a, 122b and 122c are provided as conductive material. Stubs 122a may be connected to central conductor 122 by way of portions 122c to increase the bandwidth of dipole 122, each having a stub length $L_s$ and a stub separation $S_s$. To decrease the necessary length of dipole $L_D$, conductive portions 122b may be used to provide capacitive end loading. While the drawings in this application are not to scale, for an RFID tag having a resonant frequency of 960 MHz, appropriate values for $L_D$, $L_s$, and $S_s$ are 9 cm, 3.6 cm and 3 cm respectively. However, a dipole can be designed for other frequency regimes as well.

Resonant circuit 130 also preferably includes a circuit 138 that includes identification information unique to a product. For example, circuit 138 may include simple hard wired information such as a serial number unique to a product being labeled with the device 100. Moreover, resonant circuit 130 may include a microchip 140. Microchip 140 may be provided with an onboard processor as well as memory, as is known in the art. Microchip 140 may include detailed information about a product that is labeled with device 100. Such information may include, for example, product data such as product destination and weight, shipping information and the like.

In accordance with a further aspect of the invention, the device may be configured to absorb a first electromagnetic wave at the resonant frequency, and transmit or backscatter a second electromagnetic wave at the resonant frequency in response to the first electromagnetic wave.

As embodied herein, since device 100 is configured to resonate at a particular center frequency, it may absorb energy from a source in the form of a first electromagnetic wave 142, as depicted in FIG. 7. This energy may be used to power microchip 140. After receiving energy from first electromagnetic wave 142, microchip 140 may be configured to transmit requested information as a second electromagnetic wave 144 through resonant circuit 130. Device 100 is preferably configured to transmit unique identification information in the second electromagnetic wave 144. By way of further example, an additional power source such as a battery 146 may be operably coupled to microchip 140 as depicted in FIG. 7 so that device 100 is not dependent on receiving electromagnetic energy from an outside source in order to function, thereby making it an active tag instead of a passive one.

In accordance with still another aspect of the invention, the pattern may be formed in a variety of ways.

For purposes of illustration and not limitation, as embodied herein, pattern 110 is formed directly from metal. For example, pattern 110 may be formed from a metallic wire, from stamping a metallic sheet with a die, by embossing a foil on a substrate, and the like. Moreover, pattern 110 may be formed by way of photolithographic deposition techniques such as chemical vapor deposition, or plasma enhanced chemical vapor deposition, among others.

In accordance with still another aspect of the invention, a device is provided wherein the pattern is formed by printing a conductive material onto a substrate.

For purposes of illustration and not limitation, as embodied herein and as depicted in FIG. 8, pattern 110 is formed by printing a conductive material 150 onto a substrate 160 using a print head 152. Conductive material 150 preferably includes metallic particulate material that is adapted and configured to be printed onto a substrate 160, as are known in the art. For example, silver based conductive inks are known in the art and are suitable for RFID technologies. The pattern 110 may be printed, for example, by using a laser printer or an inkjet printer.

Substrate 160 may take on a variety of forms. For example, substrate 160 may be a medium suitable to be printed on such as various types of paper and plastic sheeting suitable to be converted into identification tags that may be adhered to objects using an adhesive. Moreover, substrate 160 may be packaging material suitable for enclosing and/or accompanying a product. As will be appreciated by those of skill in the art, the nature of the substrate 160 as well as the contents of any shipping container that device 100 is formed on may cause the center frequency of device 100 to shift. As such, the environment that device 100 will be placed in must also be considered in the process of designing a specific device 100 for a particular application.

Moreover, while other portions of resonant circuit 130 may be formed separately from pattern 110 and later placed in communication therewith, it is also possible to form other portions of resonant circuit 130 on the substrate 160 along with pattern 110, such as by printing and/or other deposition techniques such as plasma enhanced chemical vapor deposition. Thus, pattern 110 and other portions of resonant circuit 130 could be formed in the same manner at the same time.

It is also possible to create a pattern that is composed of multiple layers of conductors separated by insulating layers of dielectric material.

For purposes of illustration and not limitation, as embodied herein and as depicted in FIGS. 8(*a*)-8(*c*), pattern 110 may be formed from multiple layers of conductive material 162a-162n that are deposited on substrate 160. For example, as depicted in FIG. 9(*a*), first conductive layer 162a may be deposited directly on substrate 160 and be provided with an initial pattern 164 of conductive material. Since the embodiment of FIG. 9 contemplates multiple layers of material on top of first conductive layer 162a, it is not necessary for pattern 164 to be in a form that may be read optically, such as by a bar code scanner. As such, pattern 164 may be configured to resemble a spiral pattern, serpentine pattern or other pattern to optimize the length and shape of pattern 110, based on the application at hand.

As shown in FIG. 9(*b*), a second layer 166 of dielectric material may be provided. Specifically, insulating layers 166a-166n may be disposed between layers 162a-162n. Specifically, second layer 166a is preferably composed of a dielectric material to electrically insulate first conductive layer 162a from conductive layer 162b, described below. One or more portions 168 of first layer 162a are preferably not covered by second layer 166a to permit third layer (a conductive layer) 162b to be placed in electrical contact therewith. Second layer 166 may be sprayed on by the same print head 152 as first layer 162, or by a separate print head 154 containing dielectric material. While the embodiment of FIG. 9 is depicted as being formed by a print head, other techniques may be used, as described above, such as photolithography and the like.

As shown in FIG. 9(*c*), a third layer 162b in the form of a second conductive layer is disposed on the second insulating layer 166. As depicted, a plurality of interleaved conductive and dielectric layers may be provided, terminating in a top layer 162n including a terminal pattern 170 formed at least in part of conductive material capable of being read by a bar code reader. For example, only a portion of terminal pattern 170 may be formed from conductive material, with the remainder of pattern 170 being formed from nonconductive ink. The initial pattern 164 of conductive material and the conductive portion of terminal pattern 170 of conductive material are preferably in direct electrical contact at location 168. Electrically coupling the two layers 162a, 162n may provides for a longer effective conductor, if desired. Note that, in practice, the overall thickness of identification tag is quite small, and that the thicknesses shown of each layer in FIG. 9(*c*) is for illustration only.

It is also possible to interleave additional layers between the substrate, first second and third layers as described above. For example, it is possible to provide additional dielectric or conductive layers between the substrate and first layer or subsequent layers, if desired. This can be done for a variety of reasons, such as to facilitate manufacturing. If desired, two consecutive dielectric layers may be desired, such as layers of different dielectric materials. Moreover, two consecutive layers of conductive material could be provided in certain circumstances, such as where the geometry of the circuit pattern is easier to manufacture by using multiple layers. Additionally or alternatively, different conductive inks can be applied to form the same or different conductive layers.

Initial pattern 164 and terminal pattern 170 could also be electromagnetically coupled. For example, if initial pattern 164 and terminal pattern 170 are provided in an overlapping spatial relationship as depicted in FIG. 10, initial pattern 164 could trap a significant amount of energy via inductive coupling with first electromagnetic wave 142 (see FIG. 7), and impart it to terminal pattern 170 via lead 172 by way of transformer action via magnetic flux 173. Note that FIG. 10 is intended to merely illustrate the physical relationship between initial pattern 164 and terminal pattern 170, and is not intended to fully illustrate the identification tag made in accordance with the present invention.

Moreover, it is well within the scope of the invention to provide a pattern with n layers, as depicted in FIG. 9. Thus, patterns with three, four, five or more conductive layers 162 may be provided, as desired.

In accordance with a further aspect of the invention, a reader for identifying objects is provided.

For purposes of illustration and not limitation, as embodied herein and as depicted in FIG. 7, a reader 180 is provided. As depicted in FIG. 7, reader 180 includes an optical reader, such as a bar code reader 182 for optically reading a conventional bar code or a device 100 as described herein, and a radio frequency reader 184 such as a conventional RF scanner for transmitting a first electromagnetic wave 142 to device 100 at a resonant frequency of the tag, and receiving a second electromagnetic wave 144 in response to the first electromagnetic wave containing information, such as identification information.

Advantageously, reader 180 may also be used for scanning bar codes or other indicia that are not also radio frequency identification tags. Reader 180 also includes a controller 186 including a processor 188 and memory 190 as are known in the art operably coupled to a power source, such as battery 192. Controller 186 is adapted and configured to control bar code reader 182 and radio frequency device 184.

The optical reader 182 of reader 180 may be configured and adapted to transmit a beam of light 194 at any desired wavelength to read indicia such as a conventional bar code. Light beam 194 may be composed of a plurality of light bands. For example, light in the visible spectrum, such as colored light, may be transmitted to aid an operator in aiming reader 180, while light of a different frequency may also be transmitted capable of discerning finer features of an indicia such as a bar code (such as ultraviolet light).

Radio frequency reader 184 includes a resonant circuit 196 adapted to transmit first electromagnetic wave 142 and receive second electromagnetic wave 144. As depicted in FIG. 7, radio frequency reader 184 may be adapted and configured to in transmit at one or a plurality of frequencies, as described herein. It is possible to transmit at different frequencies by including a plurality of circuits 198 having different frequencies within resonant circuit 196, wherein a switching mechanism 200 operably coupled to controller 186 is adapted and configured to select an circuit 198 configured to resonate at the desired frequency. Additionally or alternatively, it is possible to provide a variable circuit 202 (including, for example a variable capacitor (not shown)) operably coupled to controller 186 that is adapted and configured to adjust variable circuit 202 to resonate at the desired frequency. Also, a plurality of resonant circuits 196 may be provided in different physical orientations to facilitate receiving information from a device 100.

In accordance with still another aspect of the invention, an article of manufacture is provided. The article of manufacture includes an object to be sold in combination with a device as described herein.

For purposes of illustration and not limitation, as embodied herein and as depicted in FIG. 11, an article of manufacture including a product 300 having a device 100 affixed thereto is provided. Product 300 may be contained inside protective packaging wherein device 100 is disposed on the protective packaging. Product 300, of course, may be any one of a multitude of products, including electronics items such as television sets, appliances, and the like, or any other item of commerce that is suitable for receiving a device 100 that may function, for example, as an identification tag. For example, it is possible for device 100 to be adapted and configured to be attached to clothing items on racks in a clothing store, or even attached to food items in a supermarket. By way of further example, it is possible to attach device 100 to perishable goods. Device 100 may thus store information relating to the perishable nature of the goods, including the date of manufacture and/or expiration date. As discussed above, the use and environment device 100 is to be placed is should be considered in designing device 100 for a particular application.

In further accordance with the invention, a system is provided for identifying an object. The system includes a device as described herein, such as an identification tag in combination with a reader capable of detecting identification information from the tag.

For purposes of illustration and not limitation, as embodied herein and as depicted for example in FIG. 7, a system is provided including a device 100 as provided herein, and a reader. The reader may be similar in design and function to reader 180 described herein, or may take other forms. For example, the system of the invention may include a reader that only scans the optical characteristics of device 100. Alternatively, the reader may be configured to only interact with device 100 electromagnetically. As such, one or more of a plurality of resonant frequencies are possible, as described herein.

In further accordance with the invention, a method for forming a device is also provided.

For purposes of illustration and not limitation, as embodied herein and as depicted in FIGS. 9(a)-9(c), the method includes the step of providing a substrate, such as substrate 160 described herein. The method further includes the step of forming a pattern such as pattern 170 on the substrate 160 alone, and/or in combination with other non-conductive material. The visible portion of the pattern 170 preferably includes a portion capable of being read by a bar code reader. The method further includes the step of providing the remaining portions of a resonant circuit (such as resonant circuit 130 and others discussed above) configured to resonate at a predetermined frequency as described herein. The method also includes the step of placing the resonant circuit in operative contact with the conductive portion of pattern 170.

In further accordance with the invention, the pattern forming step may include forming a plurality of parallel conductive members into the portion of the pattern that is read by an optical reader as described herein. The plurality of parallel conductive members may be formed into various patterns using a variety of techniques as described above. Likewise, other portion of the resonant circuit (e.g., 130) may be printed on the substrate in whole or in part using these techniques. For example, first portion 132 of resonant circuit 130 may be printed, while further portions of the circuit may be printed including identification information, or provided separately and attached, such as microchip 140. By way of further example, as depicted in FIG. 8, pattern 110 may be formed on a printer having a first printing head (e.g., 152) configured and adapted to deposit conductive material, and a second printing head (e.g., 154) configured and adapted to deposit dielectric material, as described in detail above.

In further accordance with the invention, a machine readable program is provided. The program contains instructions for controlling a system for forming a pattern of conductive material on a substrate, the system including a substrate and a printer capable of printing material on the substrate. The program includes means for instructing the printer to print a pattern on the substrate, the pattern adapted and configured to be read optically by a reader to obtain information, the pattern including conductive material.

For purposes of illustration and not limitation, as embodied herein, the computer program may be embodied either in software or in hardware, such as a memory chip. The computer program may be written using well known techniques as is well known in the art and converted into machine code. The computer program in accordance with the invention has instructions therein for operating the printer. The printer may be a handheld device similar in appearance to a handheld label maker, a conventional laser or inkjet printer, or industrial printer.

Preferably, the instructions in machine readable format will be contained on a computer chip in the printer for a controller configured and adapted to control the printer to access when the printer is operated by an operator. Thus, when an operator presses a button on a control panel to make a label, for example, the computer chip containing the instructions in machine readable format will be accessed by the controller to operate the printer. However, the computer program may also be embodied in a software program and run from a computer located inside or outside of the printer.

In further accordance the machine readable program of the invention, means may also be provided for instructing the printer to print a plurality of parallel conductive members in the portion of the pattern that is read by an optical reader. The pattern may be as pattern 110 described herein configured to be read by a bar code scanner. Likewise, means may be provided for instructing the printer to print the plurality of parallel conductive members in a variety of patterns, as described above. Means may also be provided for instructing the printer to print a resonant circuit on the substrate. The program may also include instructions for printing a plurality of conductive layers interspersed with a plurality of dielectric layers as described herein, where the top most layer printed is preferably a pattern that is at least partially formed from conductive material, and that may be optically read by an optical reader, such as a bar code reader.

In accordance with still another aspect of the invention, a machine readable program is also provided that is adapted and configured to facilitate the design of a device as described herein. As discussed above, the complexity of the geometries of the resonant circuit 130 must be taken into account when designing a device 100 to resonate at a desired resonant frequency. As such, a computer program is provided herein to facilitate designing such a device as device 100. Computer programs exist for designing resonant circuits as are known in the art. Thus, in accordance with an embodiment of the present invention, a computer program is provided that is configured to receive an input for a desired bar code pattern and a desired resonant frequency. The bar code can be designed using the program, or can be imported from other software, or scanned in to a viewable file format, such as a portable document format. The computer program may also be further adapted and configured to receive additional inputs from an operator such as material from which to print a device as described herein, the dimensional size of the device 100 that is desired, whether the device is to be passive or active, as well as all other possible variables disclosed herein. The computer program is further configured to provide different choices for the geometry of a pattern 110 (e.g., such as FIGS. 1-6 herein), or may choose a geometry automatically, if desired. The program is further adapted to design a resonant circuit 130 including, for example, pattern of conductive material 110 based on the inputted information. The resonant circuit design can be accepted or modified by a user of the program, and the program can be further adapted to instruct a printer to print conductive and/or non conductive material on a substrate to create device 100.

The devices, methods, systems and machine readable programs of the present invention, as described above and shown in the drawings, provide for a device with superior properties to those of the current state of the art. It will be apparent to those skilled in the art that various modifications and variations may be made in the device and method of the present invention without departing from the spirit or scope of the invention. Thus, it is intended that the present invention include modifications and variations that are within the scope of the appended claims and their equivalents.

What is claimed is:

1. A device for containing information comprising:
 a) a substrate;
 b) a first layer disposed on the substrate, the first layer including an initial pattern of conductive material;
 c) a second layer disposed on a portion of the first layer, the second layer being a dielectric material;
 d) a third layer disposed on the second layer, the third layer including a terminal pattern adapted and configured to be read optically by a reader to obtain information, the pattern formed at least in part by electrically conductive material, wherein the initial pattern and the terminal pattern are in electrical contact with each other; and
 e) a resonant circuit configured to resonate at a resonant frequency, the resonant circuit formed at least in part from at least a portion of the electrically conductive material of the initial pattern and the terminal pattern.

2. The device of claim 1, wherein the terminal pattern includes a plurality of parallel conductive members and is adapted and configured to be read optically by a bar code reader.

3. The device of claim 2, wherein the plurality of parallel conductive members are formed in a serpentine pattern.

4. The device of claim 2, wherein the plurality of parallel conductive members are formed in a continuous winding pattern.

5. The device of claim 2, wherein the resonant circuit acts as a dipole.

6. The device of claim 5, wherein each of the conductive members are connected by a straight conductor at an end of each of the conductive members.

7. The device of claim 5, wherein each of the conductive members are connected by a straight conductor proximate to a central region of each of the conductive members.

8. The device of claim 2, wherein the plurality of conductive members are arranged into a two-dimensional bar code pattern.

9. The device of claim 1, wherein the device is an identification tag configured to receive a first electromagnetic wave at the resonant frequency, and transmit a second electromagnetic wave in response to the first electromagnetic wave.

10. The device of claim 9, wherein the identification tag is configured to transmit unique identification information in the second electromagnetic wave.

11. The device of claim 1, wherein the resonant frequency is between about 125 kHz and 150 kHz.

12. The device of claim 1, wherein the resonant frequency is between about 13 MHz and 14 MHz.

13. The device of claim 1, wherein the resonant frequency is between about 850 MHz and 1000 MHz.

14. The device of claim 1, wherein the portion of the pattern made from conductive material is formed from metal.

15. The device of claim 14, wherein the portion of the pattern made from conductive material is formed from a metallic wire.

16. The device of claim 14, wherein the portion of the pattern made from conductive material is formed from a metallic sheet.

17. The device of claim 1, wherein at least one of the layers is formed by using a laser printer.

18. The device of claim 1, wherein at least one of the layers is formed by using an ink jet printer.

19. The device of claim 1, wherein an additional layer of material is disposed between at least one of:
  a) the substrate and the first layer;
  b) the first layer and the second layer; and
  c) the second layer and the third layer.

20. A method for forming a device comprising:
  a) providing a substrate;
  b) forming a first conductive layer having an initial pattern of conductive material on at least a portion of the substrate;
  c) forming a first dielectric layer on at least a portion of the first layer;
  d) forming a second conductive layer on the first dielectric layer, the second conductive layer including a terminal pattern capable of being read optically by a reader to obtain information, the pattern formed at least in part by conductive material, wherein the initial pattern and the terminal pattern are in electrical contact; and
  e) forming a resonant circuit configured to resonate at a resonant frequency, the resonant circuit formed at least in part from at least a portion of the electrically conductive material of at least one of the initial pattern and the terminal pattern.

21. The method of claim 20, wherein the terminal pattern forming step includes forming a plurality of parallel conductive members, the plurality of conductive members configured and adapted to be read by a bar code reader.

22. The method of claim 21, wherein the plurality of parallel conductive members are formed into a serpentine pattern.

23. The method of claim 21, wherein the plurality of parallel conductive members are formed into a continuous winding pattern.

24. The method of claim 20, wherein the plurality of conductive members are arranged into a two-dimensional bar code pattern.

25. The method of claim 21, further including the step of connecting the parallel conductive members with conductive material.

26. The method of claim 20, wherein the pattern is formed at least in part from a metallic member.

27. The method of claim 26, wherein the pattern is formed at least in part from a metallic wire.

28. The method of claim 26, wherein the pattern is formed at least in part from a metallic sheet.

29. The method of claim 20, wherein the first conductive layer is formed by printing conductive material onto the substrate.

30. The method of claim 20, further comprising printing conductive material on the substrate.

31. The method of claim 29, wherein one or more of the conductive layers is formed by using a laser printer.

32. The method of claim 29, wherein the conductive layer is formed by using an ink jet printer.

33. The method of claim 30, wherein the device is formed by a printer having a first printing head configured and adapted to deposit conductive material, and a second printing head configured and adapted to deposit dielectric material.

34. A machine readable program resident on a computer-readable medium containing instructions for controlling a system for forming a pattern of conductive material on a substrate, the system including a substrate and a printer capable of printing material on the substrate, wherein the program comprises:
  means for instructing the printer to print a first layer on the substrate, the first layer including an initial pattern including conductive material;
  means for instructing the printer to print a second layer over the first layer, the second layer including dielectric material; and
  means for instructing the printer to print a third layer over the second layer, the third layer having a terminal pattern configured and adapted to be read optically by the reader to obtain the information, the terminal pattern including conductive material, wherein the initial pattern of conductive material and the terminal pattern of conductive material are in electrical contact.

35. The machine readable program of claim 34, further comprising means for instructing the printer to print a plurality of parallel conductive members in the portion of the terminal pattern that is read optically.

36. The machine readable program of claim 35, further comprising means for instructing the printer to print the plurality of parallel conductive members in a serpentine pattern.

37. The machine readable program of claim 35, further comprising means for instructing the printer to print the plurality of parallel conductive members in a continuous winding pattern.

38. The machine readable program of claim 35, further comprising means for instructing the printer to print the plurality of parallel conductive members in a two-dimensional bar code pattern.

39. The machine readable program of claim 34, further comprising means for instructing the printer to print additional components of a resonant circuit on the substrate.

40. The machine readable program of claim 34, wherein the primer is a laser printer.

41. The machine readable program of claim 34, wherein the primer is an ink jet printer.

42. A system for identifying an object comprising:
  a) a device comprising:
    i) a substrate;

ii) a first conductive layer disposed on at least a portion of the substrate, the first conductive layer including an initial pattern of conductive material;

iii) a first dielectric layer disposed on the first conductive layer;

iv) a second conductive layer disposed on the first dielectric layer, the second conductive layer including a terminal pattern adapted and configured to be read optically by a reader to obtain information, the pattern formed at least in part by electrically conductive material, wherein the initial pattern and the terminal pattern are in operative communication with each other;

v) a resonant circuit configured to resonate at a resonant frequency, the resonant circuit formed at least in part from at least a portion of the electrically conductive material of at least one of the initial pattern and the terminal the pattern; and b) a reader adapted and configured to read information from the device.

43. The system of claim 42, wherein the reader is configured to optically scan the pattern to obtain the information.

44. The system of claim 42, wherein the reader is configured to transmit a first electromagnetic wave to the device at the resonant frequency, and receive a second electromagnetic wave from the resonant circuit in response to the first electromagnetic wave.

45. The system of claim 42, wherein the resonant frequency is between about 125 kHz and 150 kHz.

46. The system of claim 42, wherein the resonant frequency is between about 13 MHz and 14 MHz.

47. The system of claim 42, wherein the resonant frequency is between about 850 MHz and 1000 MHz.

48. The system of claim 42, wherein the resonant frequency is between about 2 GHz and 3 GHz.

49. The device of claim 1, wherein the substrate is disposed on a product.

50. The device of claim 1, wherein the substrate is disposed on a protective packaging enclosing a product.

* * * * *